H. C. RICE.
Filter for Tea and Coffee.
No. 217,408. Patented July 8, 1879.
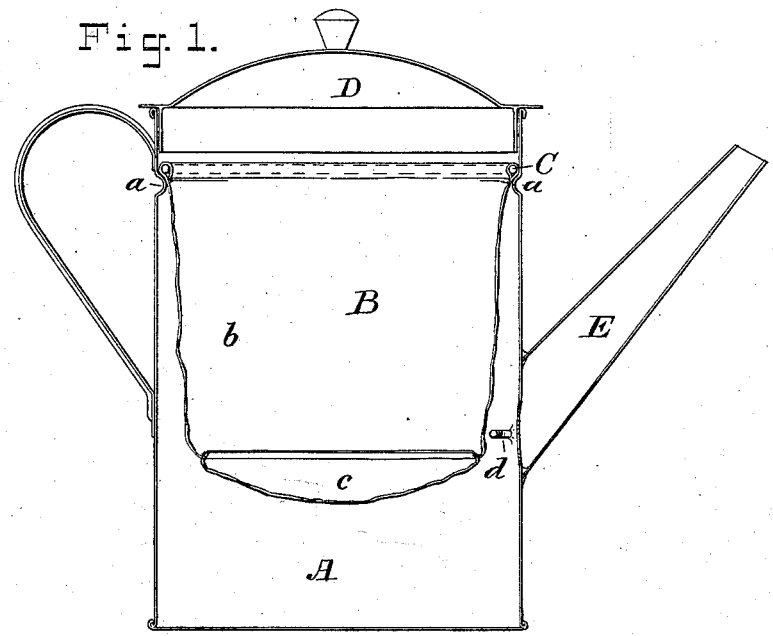
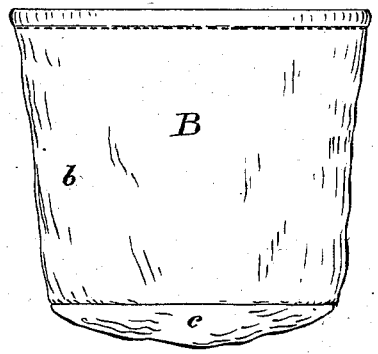
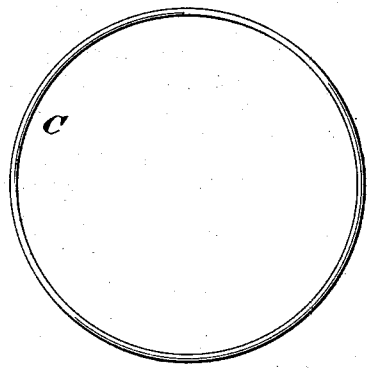
ATTEST:
Edwin A. Kennedy.
George H. Fraser.
INVENTOR:
Henry C. Rice,
By his Attorneys,
Burke, Fraser & Connett.

UNITED STATES PATENT OFFICE.

HENRY C. RICE, OF LOUISIANA, MISSOURI.

IMPROVEMENT IN FILTERS FOR TEA AND COFFEE.

Specification forming part of Letters Patent No. 217,408, dated July 8, 1879; application filed January 9, 1879.

*To all whom it may concern:*

Be it known that I, HENRY C. RICE, of Louisiana, in the county of Pike and State of Missouri, have invented certain Improvements in Filters for Tea and Coffee, of which the following is a specification.

This invention relates to coffee and tea pots, but more especially coffee-pots, in which the ground coffee or other substance from which the decoction is to be made is placed in a bag pendent in the pot or vessel, and hot water poured in upon the same, being allowed to drip through into the pot.

In the drawings, Figure 1 is a vertical mid-section of a coffee-pot provided with my improvements. Fig. 2 is a side elevation of the bag removed from the pot. Fig. 3 is a plan of the ring.

Let A represent a pot or vessel of any kind, provided with a ledge, $a$, of some kind on its inner wall, preferably formed by raising a bead in the metal of the pot itself. Below this bead the pot may be of any form; but from the bead to the top the wall of the pot should be vertical or a little flared.

B is a bag of some textile material, having vertical side walls $b$ and a disk-shaped bottom, the bottom being joined to the sides by a peripheral horizontal seam, as shown.

Heretofore in constructing bags for this purpose they have been made from one piece of material, with a cross-seam to join the bottom, or two side seams, and a fold at the bottom.

My bag is composed, as above stated, of two pieces, by which means a broader and flatter bottom is provided, and a more effective straining-surface obtained. The bottom may be square; but I prefer a round bottom, to coincide with the horizontal contour of the pot.

In the upper margin of this bag is fixed, by sewing or otherwise, a solid ring of wire, C, (shown in Fig. 3,) arranged to fit, when inclosed in the fabric of the bag, the mouth of the pot. When the bag is suspended in the pot this ring rests upon and is supported by the ledge $a$.

D is the lid of the pot, which may enter far enough to rest upon the ring C, and assist in keeping it down upon the ledge.

E is the spout of the pot, the opening to which is provided with a guard, $d$, preferably of bent wire, to prevent the bag from closing the opening when pouring out the contents of the pot.

I am aware that a bag provided with a straight fold or seam at the bottom and an open elastic ring has before been used, as such a bag and ring were shown in my patent dated June 11, 1878, and such a bag and ring form no part of my present invention; but What I do claim is—

1. In a strainer for coffee and similar substances, the bag B, of textile material, made of two pieces, $b\ c$, the former forming the wall and the latter the bottom of the bag, and a ring in the top to keep the bag expanded and to support it in the pot or vessel, substantially as set forth.

2. The combination of a pot or vessel, A, having a ledge or projection, $a$, with the bag B, constructed, as shown and specified, of the parts $b\ c$, the solid wire ring C, arranged in the top of the bag, so as to rest upon the ledge $a$, and the guard $d$, arranged across the spout-opening, substantially as set forth.

In witness whereof I have hereunto signed my name in the presence of two subscribing witnesses.

HENRY C. RICE.

Witnesses:
 JAY L. TORREY,
 D. P. DYER.